W. CASSILL
DOOR-CHECK.

No. 182,889. Patented Oct. 3, 1876.

WITNESSES:
H. Rydqvist
John Goethals

INVENTOR:
Wm Cassill
BY Munn & Co
ATTORNEYS.

UNITED STATES PATENT OFFICE.

WILLIAM CASSILL, OF REED'S MILLS, OHIO, ASSIGNOR TO HIMSELF AND JAMES M. HENDERSON, OF SAME PLACE.

IMPROVEMENT IN DOOR-CHECKS.

Specification forming part of Letters Patent No. 182,889, dated October 3, 1876; application filed August 21, 1876.

*To all whom it may concern:*

Figure 1:
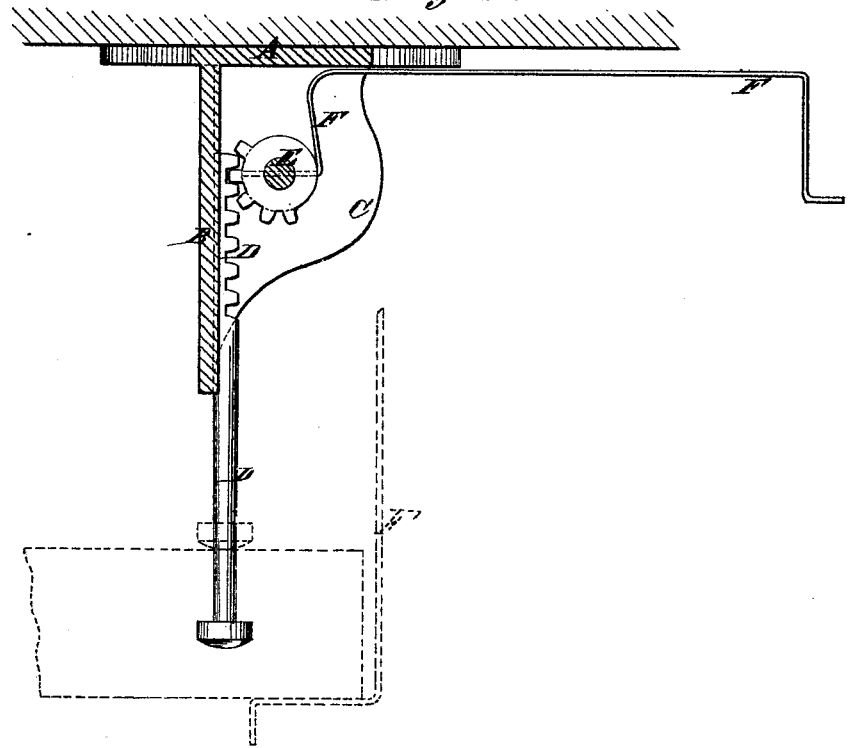
Figure 2:
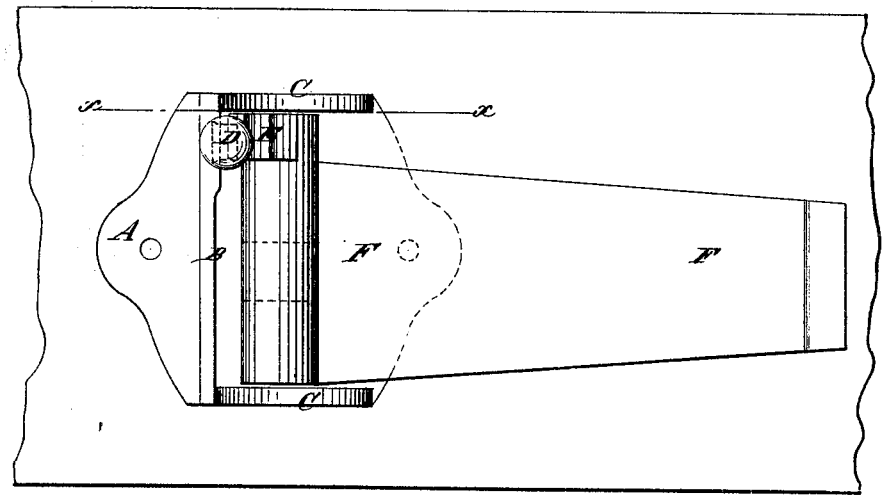

Be it known that I, WILLIAM CASSILL, of Reed's Mills, in the county of Vinton and State of Ohio, have invented a new and useful Improvement in Door Stop and Fastener, of which the following is a specification:

Figure 1 is a top view of my improved door-fastener, partly in section through the line $x\ x$, Fig. 2. Fig. 2 is a front view of the same.

Similar letters of reference indicate corresponding parts.

The object of this invention is to furnish a simple and effective device for accomplishing the twofold purpose of preventing the knob of the door from injuring the plastering or wall when the door is swung open, and to fasten the door open, so that it cannot be blown shut by the wind.

The invention consists in the novel combination of the case or frame, the sliding bumper, actuated by rack and pinion, the pivoted cylinder and the catch, with each other, as hereinafter more fully described and definitely claimed.

A is a plate, provided with holes to receive the screws, by which it is secured to the baseboard of the room. Upon the plate A is formed a plate, B, projecting at right angles, and the edges of which are connected with the top and bottom edges of the plate A by plates C. The plates A B C form the frame or case of the device.

D is the bumper, the outer end or head of which should be provided with a rubber cap to prevent noise, and to prevent it from bruising the door.

The inner part of the bumper D, actuated by rack and pinion, slides in a guide-groove in the inner side of the plate B, and upon its forward side are formed teeth to mesh into the teeth formed upon a cylinder, E, the journals of which work in holes in the plates C, and to which is rigidly attached the catch F. The catch F is bent back and outward, so as to rest against the plate A and project parallel with the base-board, to which said plate A is secured. The outer part of the catch F is bent forward at right angles to pass around the edge of the door and catch upon it, and its end is bent outward so that it may be pushed back with the foot to release the door and allow it to be closed. The catch F should be faced with leather, rubber, or cloth to prevent it from wearing or chafing the door.

In using the device, as the door is swung open it strikes against and pushes back the bumper B, the rearward movement of which throws the catch F forward to catch the edge of the door and hold it open until released by turning back the said catch F.

If desired, the bumper D and cylinder E may be made without teeth, the said cylinder being operated by the movement of the bumper D by friction.

Having thus described my invention, I claim as new and desire to secure by Letters Patent—

The combination of the case or frame A B C, the sliding bumper D, actuated by rack and pinion, the pivoted cylinder E, and the catch E, with each other, all substantially as herein shown and described.

WILLIAM CASSILL.

Witnesses:
LEONARD A. LANTZ,
SUSAN LANTZ.